United States Patent [19]
Kato et al.

[11] Patent Number: 5,991,002
[45] Date of Patent: Nov. 23, 1999

[54] METHOD FOR CORRECTING A DEFECT IN A LIQUID CRYSTAL PANEL

[75] Inventors: Yosihisa Kato, Tanashi; Masazumi Shikanai, Hino; Hidehiro Morita, Hachioji, all of Japan

[73] Assignee: Casio Computer Co., Ltd., Tokyo, Japan

[21] Appl. No.: 09/159,863

[22] Filed: Sep. 24, 1998

[30] Foreign Application Priority Data

Oct. 2, 1997 [JP] Japan ................................ 9-284254

[51] Int. Cl.[6] .............................. G02F 1/13; G02F 1/1333
[52] U.S. Cl. .............................. 349/192; 349/84; 349/158
[58] Field of Search .................................. 349/192, 158, 349/84

[56] References Cited

U.S. PATENT DOCUMENTS

| | | | |
|---|---|---|---|
| 5,142,386 | 8/1992 | Ishihara | 359/45 |
| 5,267,066 | 11/1993 | Nakai et al. | 359/67 |
| 5,280,374 | 1/1994 | Nakai et al. | 359/67 |
| 5,373,379 | 12/1994 | Nakai | 359/59 |
| 5,638,199 | 6/1997 | Tsubota et al. | 349/192 |

FOREIGN PATENT DOCUMENTS

406148607A 5/1994 Japan.

Primary Examiner—William L. Sikes
Assistant Examiner—Tarifur R. Chowdhury
Attorney, Agent, or Firm—Frishauf, Holtz, Goodman, Langer & Chick, P.C.

[57] ABSTRACT

A portion of a transparent substrate corresponding to a defective pixel of a liquid crystal panel is protruded like a dome to a suction hole by decompressing the interior of a vacuum suction head. As a result, the gap between the transparent substrates of the portion corresponding to the defective pixel of the liquid crystal panel becomes greater than that in a surrounding portion. In this state, a laser beam is radiated to the dome-like deformed portion of the transparent substrate in the portion corresponding to the defective pixel, so that a bubble is generated in a liquid crystal layer. The bubble expands in a region shaped like a circle centered at the point where the gap between the transparent substrates is the greatest, on a cross section parallel to the transparent substrates. Thus, the size of the bubble and the range where a substance is scattered are limited, thereby accurately correcting the defective pixel and improving the display quality after the correction.

12 Claims, 9 Drawing Sheets

METHOD FOR CORRECTING A DEFECT IN A LIQUID CRYSTAL PANEL

BACKGROUND OF THE INVENTION

The present invention relates to a method for correcting a defect in a liquid crystal panel to correct a defective pixel existing in the liquid crystal panel.

A type of liquid crystal panel can be driven by an active matrix driving system. A liquid crystal panel of this type has first and second transparent substrates. The first transparent substrate has a transparent common electrode on a surface opposing the second transparent substrate, and the second transparent substrate has pixel electrodes arranged in a matrix on a surface opposing the first substrate. Each pixel electrode is connected to a switching element, such as a TFT (Thin Film Transistor). A liquid crystal layer of a twist nematic (TN) type is formed between the two transparent electrodes. The pixel electrodes can be selected or not selected by the switching operation of the respective switching elements, thereby displaying an image. In general, light-shielding black stripes are provided around each pixel electrode in order to increase the contrast of the image. Further, a polarization plate is provided on the outer side of each transparent substrate.

In the liquid crystal panel as described above, if pixels, wires or switching elements come to be short-circuited due to scatter of a pixel electrode, a wire or a foreign substance, the pixel including the short-circuited portion becomes defective. In a case of a liquid crystal panel of a normally white type in which a display screen is set white when no voltage is applied, the defective pixel including a short-circuit is recognized as a luminescent spot defect, which always transmits light. To correct this defective pixel, a laser beam is applied to the pixel to cut or scatter the conductive material, which causes the short circuit, thereby correcting the pixel to a normal pixel. Alternatively, a pixel electrode, wire member, aligning film, or foreign substance may be scattered to cause the pixel to display black. The reason why a defective pixel is corrected by the latter measure will be described. In the case of a liquid crystal panel of a normally white type, a voltage is not normally applied across a pixel electrode and a common electrode by a short circuit, and a defect appears on the panel as a white luminescent spot. Therefore, the defect is conspicuous and a reproduced image cannot have a high quality.

When a laser beam is applied to such a defective pixel, a pixel electrode, wire member, aligning film, or foreign substance is scattered and deposited on the aligning film. In this state, the liquid crystal is always oriented in the vertical or horizontal direction, i.e., not twisted. As a result, the pixel always displays black. If the defective pixel always displays black like a light-shielding black stripe, the adjacent pixels are influenced little, with the result that the display quality is improved.

Figure 9A:
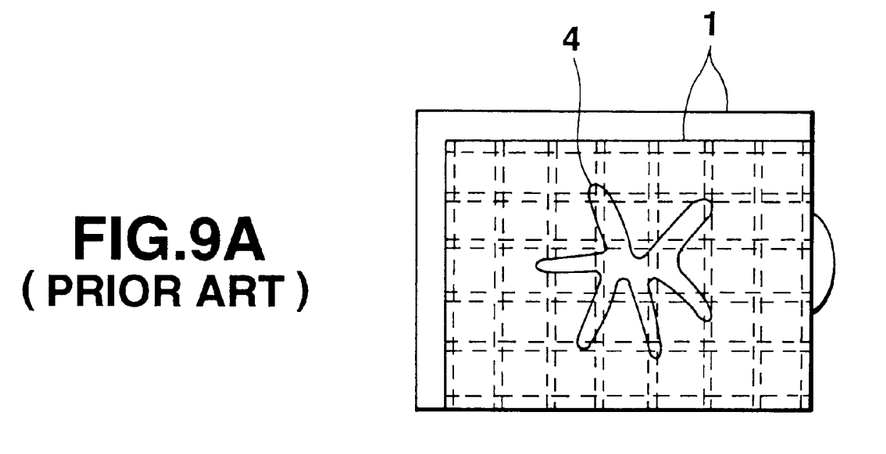
FIG. 9A is a plan view showing a state in which a laser beam is applied to a defective pixel of a liquid crystal panel according to the conventional method for correcting a defect in a liquid crystal panel.
Figure 9B:
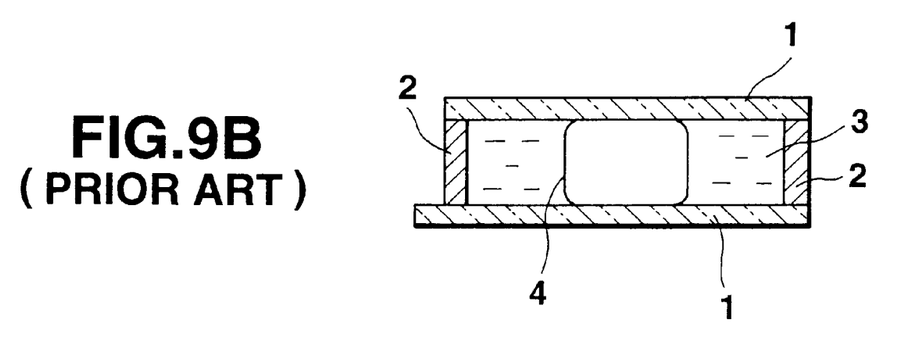
FIG. 9B is a cross-sectional view of the state shown in FIG. 9A.

The conventional method for correcting a defective pixel by radiating a laser beam will be described below. First, when a defective pixel is detected and irradiated with a laser beam, a bubble 4 is generated radially in a liquid crystal layer 3 sealed by a sealing member 2 between a pair of transparent substrates 1, as shown in FIGS. 9A and 9B. At the same time, the electrode, aligning film, foreign substance, etc., are evaporated or broken, and then scattered. When the conductive material causing the short circuit is cut by the laser beam, the defective pixel is corrected to show a high display quality. In the case of turning the pixel to always display black, after the pixel electrode, wire member, aligning film, or foreign substance is scattered and deposited on the aligning film and the bubble 4 is eliminated, the orientation of the liquid crystal molecules is turned from the TN type orientation to the vertical or horizontal orientation. As a result, transmittance of light is normally prohibited, i.e., the pixel displays black.

In the method for correcting a defective pixel described above, when a laser beam is applied to the defective pixel, the bubble 4 is generated, and a substance broken by the laser beam is scattered in a radial direction and deposited on the surface of the aligning film. The substance is scattered in a radial range shaping like a star, as shown in FIG. 9A; that is, some part of substance remains within the region of the defective pixel, another part extends to an adjacent pixel, and still another part extends to a farther pixel. Therefore, since the scattered substance is not deposited uniformly on the defective pixel, display in the pixel is not uniform, which adversely influences display in the adjacent pixels also. Thus, it is difficult to assure correction to a high display quality.

BRIEF SUMMARY OF THE INVENTION

An object of the present invention is to provide a method for correcting a defect in a liquid crystal panel, in which the ranges of a bubble and a scattered substance, generated by laser beam radiation, are controlled, so that a defective pixel can be corrected accurately, thereby improving the display quality.

According to the present invention, there is provided a method for correcting a defect in a liquid crystal panel by radiating a laser beam to a defective pixel of a liquid crystal panel, which is constituted by a pair of transparent substrates and a liquid crystal layer interposed therebetween. In the method, a gap between the pair of transparent substrates in the portion of the liquid crystal panel corresponding to at least the defective pixel is caused to be greater than that in a surrounding portion and a laser beam is radiated to the defective pixel portion. With this method, a bubble generated by the radiation of the laser beam expands like a circle in a region where the gap between the transparent substrates is greater than the other region. A substance, such as materials of a pixel electrode, a wiring member, or an aligning film broken by the radiation of the laser, or foreign substance, is deposited in the region. Since the bubble is substantially circular, the range where the substance is deposited is easily limited in a region inscribed or circumscribed to the defective pixel, or a neighboring region. Accordingly, the range where the substance is scattered is also limited to a substantially circular region corresponding to the bubble. Therefore, the substance is deposited in the defective pixel uniformly, resulting in uniform display, and further, adjacent pixels are not influenced. Thus, the display quality can be improved.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

[First Embodiment]

A method for correcting a defect in a liquid crystal panel according to a first embodiment of the present invention will be described with reference to FIGS. 1A and 1B to FIG. 4.

Figure 1A:
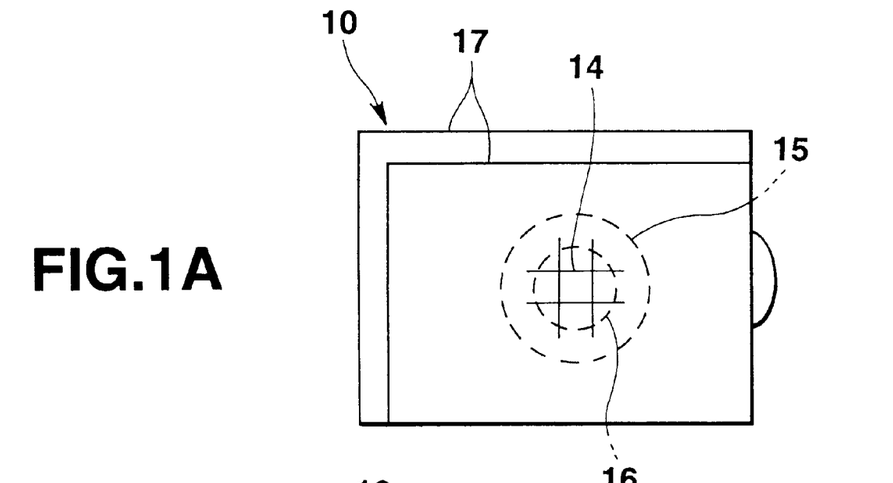
FIG. 1A is a plan view for explaining a method for correcting a defect in a liquid crystal panel according to a first embodiment of the present invention, showing a state in which a portion of a transparent substrate of the liquid crystal panel corresponding to a defective pixel is protruded by decompression of a vacuum suction head.

A liquid crystal panel 10 used in the defect correcting method is of a normally white type and driven by an active matrix driving system as in the conventional art. In the liquid crystal panel 10, a defective pixel 14 as shown in FIG. 1A may be generated due to a wiring defect of a switching element 11, such as a TFT (shown in FIG. 4), or a short circuit between a pixel electrode 12 and a common electrode 13 (both shown in FIG. 4) caused by a foreign substance in the liquid crystal panel 10. If a defective pixel is generated, when a voltage is applied to the respective pixels to turn the liquid crystal panel 10 to display black, the defective pixel 14 appears on the panel as a white luminescent spot.

Figure 1B:
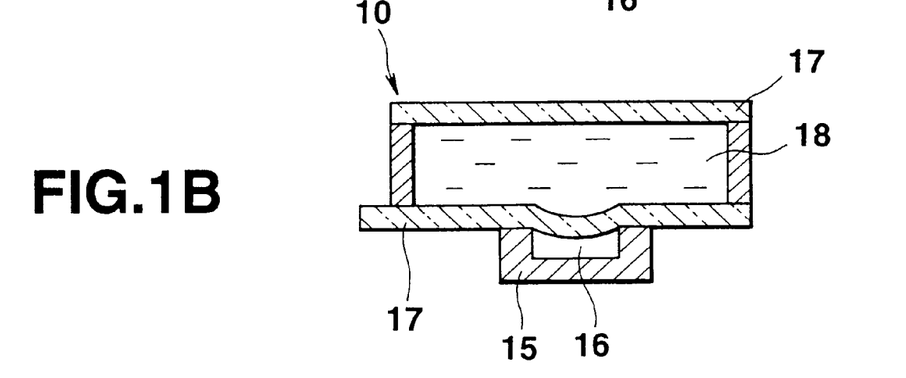
FIG. 1B is a cross-sectional view of the state shown in FIG. 1A.

To correct the defective pixel 14 by radiating a laser beam to the pixel, first, a vacuum suction head 15 is arranged on the lower surface of the liquid crystal panel 10. At this time, the center of a suction hole 16 of the vacuum suction head 15 is positioned to the defective pixel 14. In this state, when the vacuum suction head 15 is decompressed to substantially zero atmosphere, that portion of a lower transparent substrate 17 of the liquid crystal panel 10 which corresponds to the suction hole 16 of the vacuum suction head 15 is protruded in the suction hole 16 like a dome, as shown in FIG. 1B. As a result, the gap between the transparent substrates 17 of a portion corresponding to the suction hole 16 becomes greater than that between the transparent substrates 17 of a peripheral portion, i.e., a portion surrounding the suction hole 16. For example, in a case where the suction hole 16 has an inner diameter of 5 to 10 mm and a glass plate having a thickness of 0.5 to 1.1 mm is used as the transparent substrate 17 of the liquid crystal panel 10, when the suction head is not decompressed, the gap between the upper and lower transparent substrates 17 is about 5 $\mu$m. When the suction head is decompressed to substantially zero atmosphere, the gap in a central portion of the suction hole 16 is about 5.5 to 7 $\mu$m. Thus, the gap in the central portion is 0.5 to 2 $\mu$m greater than that in the surrounding portion.

Figure 2A:
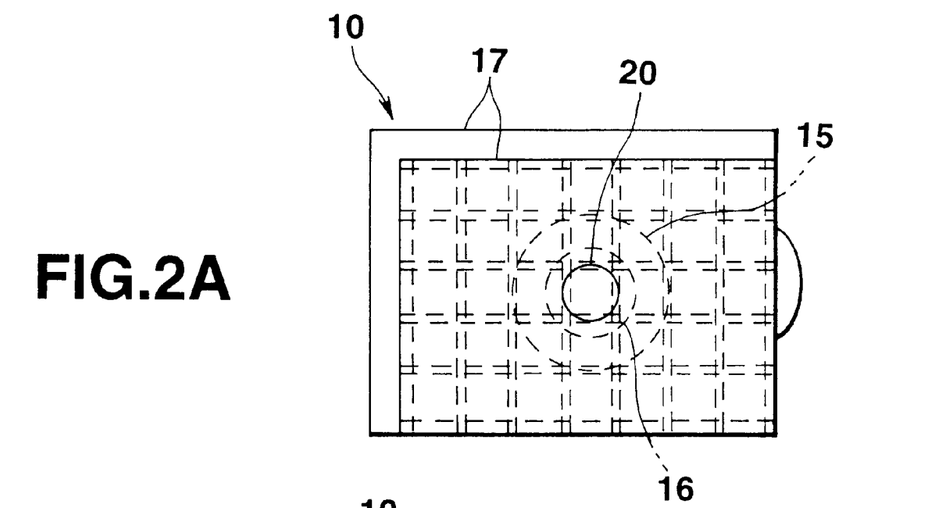
FIG. 2A is a plan view showing a state in which a laser beam is applied to the defective pixel of the liquid crystal panel and a bubble is generated.
Figure 2B:
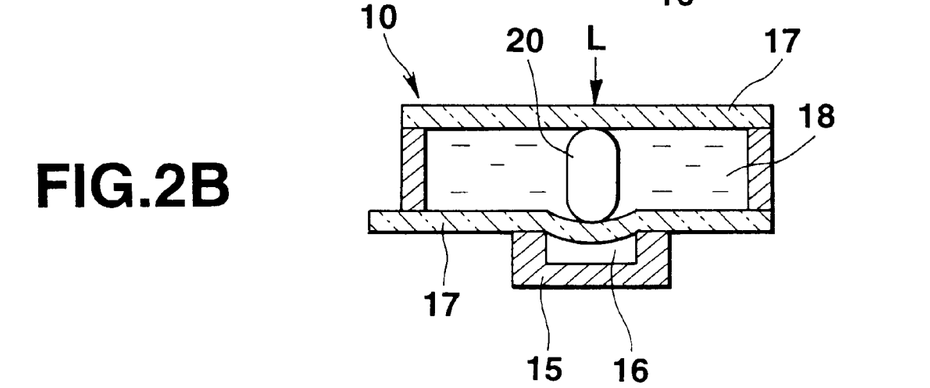
FIG. 2B is a cross-sectional view of the state shown in FIG. 2A.
Figure 4:
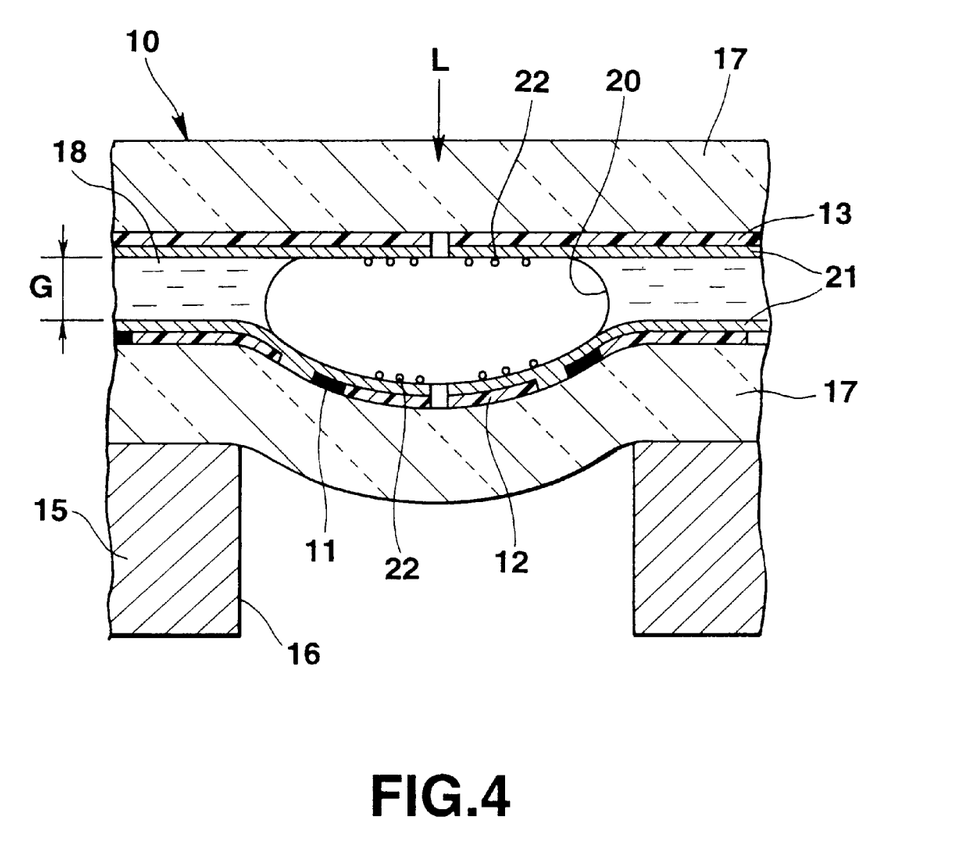
FIG. 4 is a partially enlarged cross-sectional view of the state shown in FIG. 2A, taken along a line different from that of FIG. 2B.

In this state, a laser beam is radiated from a portion above the liquid crystal panel 10 to the portion of the defective pixel 14 deformed like a dome, as indicated by the arrow show in FIG. 4. Then, as shown in FIGS. 2A, 2B and 4, a bubble 20 is generated in the liquid crystal layer 18. At the same time, substances 22, such as materials of electrodes 12 and 13 made of ITO, an aligning film 21, or a foreign substance, are evaporated and broken, and then scattered in the bubble 20. At this time, the portion corresponding to the defective pixel is decompressed by the vacuum suction head 15, and the gap between the transparent substrates 17 of this portion becomes greater than that of the surrounding portion. Therefore, as shown in FIGS. 2A and 2B, the bubble 20 generated by the radiation of the laser beam expands in a region corresponding to the suction hole 16, shaped like a circle centered at the point where the gap in the liquid crystal layer 18 is the greatest, on a plane parallel to the transparent substrate 17. As a result, the size of the bubble 20 and the range of scattered substances 22 are limited. It is preferable that an excimer laser or YAG laser be used as a source of the laser beam, and the energy level of an output of the laser be about 0.1 to 2 J/cm$^2$. The number of pulses of radiation of the laser beam may be one to several tens. The bubble 20 generated in this state has a substantially circular cross section on a plane parallel to the transparent substrate 17. Therefore, the range of the bubble can be limited to a region inscribed or circumscribed to the defective pixel, or a neighboring region. Accordingly, the range of the scattered substance is also limited to a region having a circular cross section corresponding to the bubble. Therefore, since the substance is deposited in the defective pixel uniformly, a uniform image can be obtained and an adjacent pixel cannot be affected.

Figure 3A:
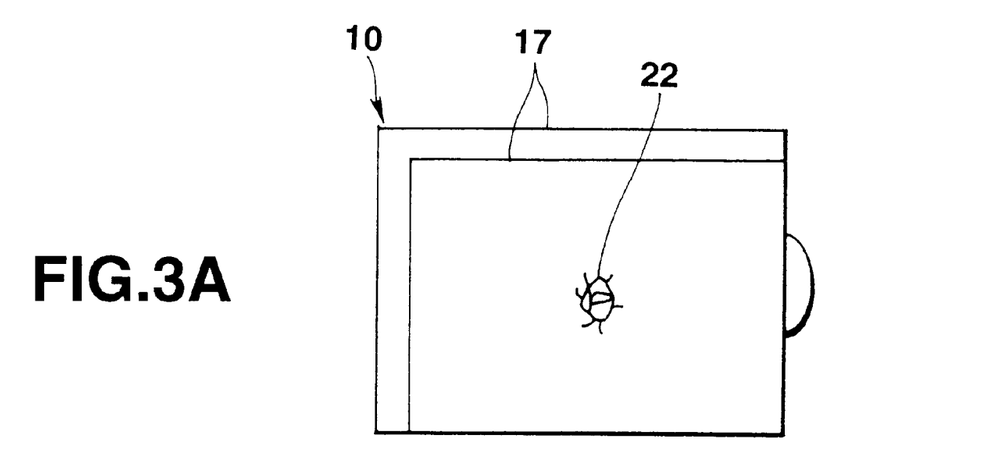
FIG. 3A is a plan view showing a state in which the decompression of the liquid crystal panel shown in FIG. 2A is released and the bubble is eliminated.
Figure 3B:
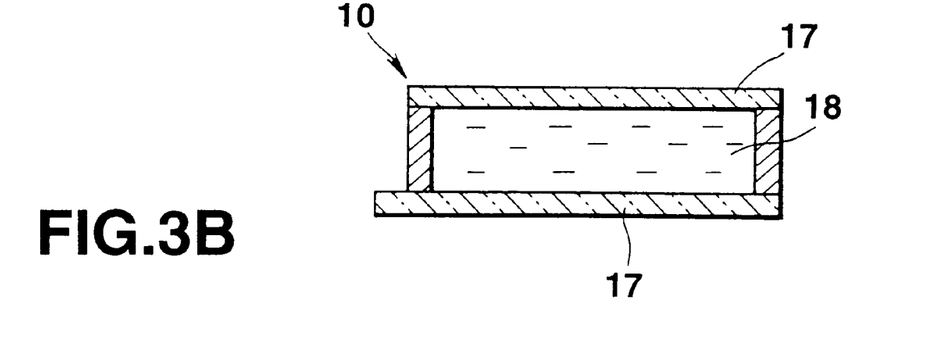
FIG. 3B is a cross-sectional view of the state shown in FIG. 3A.

After the laser beam is radiated as described above, the bubble 20 is eliminated with the lapse of time, as shown in FIGS. 3A and 3B. With this embodiment, the size of the bubble 20 and the scattering range of the substance 22 are limited in a range having a substantially circular cross section, unlike a radial range as in the conventional art. Therefore, the display quality after correction of a defective pixel is improved. The size of the bubble 20 and the scattered substance 22 can be controlled suitably depending on the degree of deformation of the transparent substrate 17 or the radiation energy of the laser beam.

[Second Embodiment]

A method for correcting a defect in a liquid crystal panel according to a second embodiment of the present invention will be described with reference to FIGS. 5A and 5B to FIG. 8. The portions the same as in the first embodiment shown in FIGS. 1A and 1B to FIG. 4 are identified by the same reference numerals as those used in FIGS. 1A and 1B to FIG. 4 and detailed descriptions thereof are omitted.

Figure 5A:
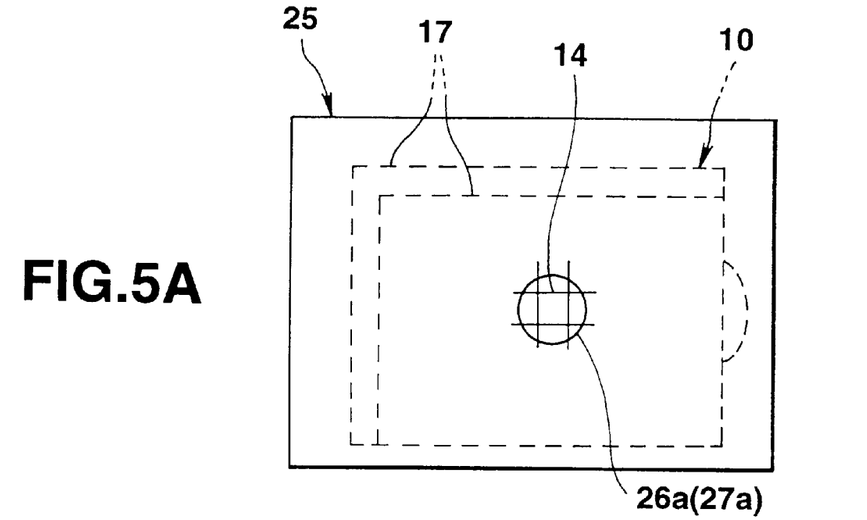
FIG. 5A is a plan view for explaining a method for correcting a defect in a liquid crystal panel according to a second embodiment of the present invention, showing a state in which a portion of a transparent substrate of the liquid crystal panel corresponding to a defective pixel is protruded by pressurizing the other portions of the transparent substrates by means of a pressurizing apparatus.
Figure 5B:
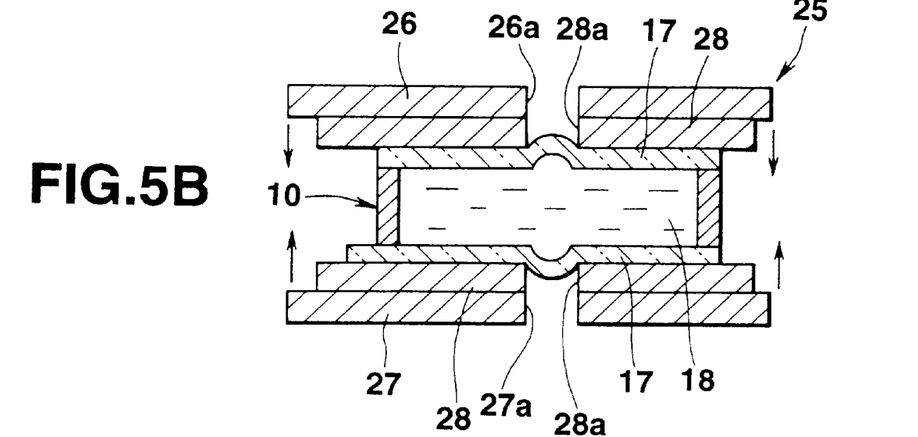
FIG. 5B is a cross-sectional view of FIG. 5A.

If the liquid crystal panel 10 includes a defective pixel 14, it is first placed in a pressurizing apparatus 25, as shown in FIGS. 5A and 5B. The pressurizing apparatus 25 has an upper pressurizing plate 26 and a lower pressurizing plate 27. Circular holes 26a and 27a are respectively formed perpendicular to the pressurizing plates 26 and 27 through opposing portions of the plates 26 and 27. Cushion members 28 are provided on the opposing surfaces the pressurizing plates 26 and 27 to prevent the transparent substrates 17 of the liquid crystal panel 10 from being damaged. The cushion members 28 have circular holes 28a, substantially the same as the circular holes 26a and 27a in size, in portions corresponding to the circular holes 26a and 27a of the pressurizing plates 26 and 27.

When the liquid crystal panel 10 is pressurized by the pressurizing apparatus 25, the circular holes 26a and 27a of the pressurizing plates 26 and 27 are applied to the defective pixel 14 of the liquid crystal panel 10. In this state, the portion of the panel which surrounds the defective pixel 14 is pressurized, as shown in FIG. 5B. Then, those portions of the transparent substrates 17 on the upper and lower sides of the liquid crystal panel 10, which correspond to the defective pixel 14, are protruded to the circular holes 26a and 27a like a dome, as shown in FIG. 5B. As a result, the gap between the upper and lower transparent substrates 17 of a portion corresponding to the circular holes 26a and 27a becomes greater than that between the upper and lower transparent substrate 17 or the peripheral portion, i.e., the portion surrounding the defective pixel 14. For example, in a case where the circular holes 26a and 27a have an inner diameter of 5 to 10 mm and glass plates having a thickness of 0.5 to 1.1 mm are used as the transparent substrates 17 of the liquid crystal panel 10, when no pressure is applied, the gap between the upper and lower transparent substrates 17 is about 5 $\mu$m. When a pressure of 0.5 to 7 Kg/cm$^2$ is applied by the pressurizing plates 26 and 27, the gap in a central portion of the circular holes 26a and 27a is about 5.5 to 10 $\mu$m. Thus, the gap in the central portion is 0.5 to 5 $\mu$m (0.25 to 2.5 $\mu$m in each side) greater than that in the surrounding portion. In this embodiment, the circular holes 26a and 27a are respectively formed in the pressurizing plates 26 and 27; however, it is possible that a circular hole 26a or 27a is formed in one of the pressurizing plates 26 and 27, while no hole is formed in the other. In this case, when the panel is pressurized by the pressurizing plates, only one transparent substrate 17, having the circular hole, is protruded like a dome, as in the first embodiment as illustrated in FIG. 4.

Figure 6A:
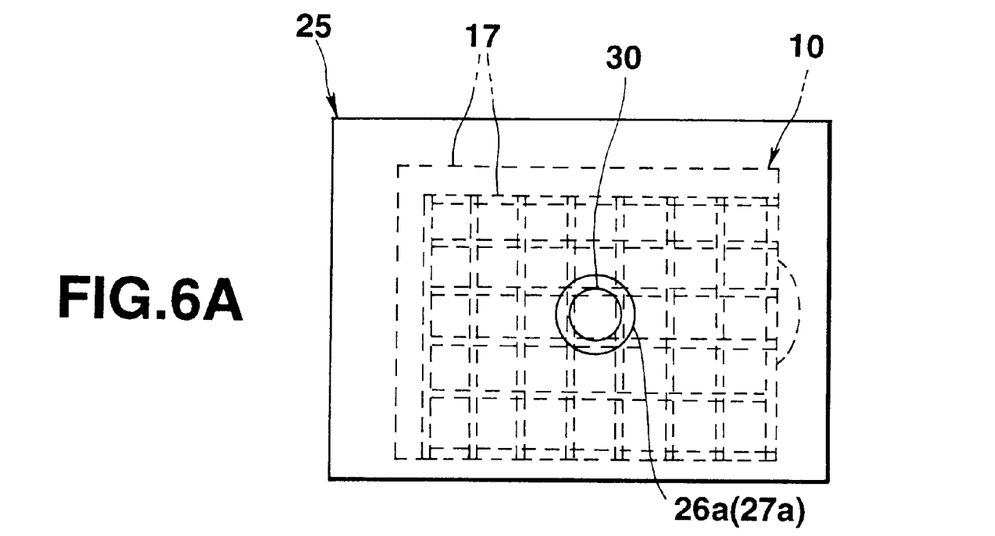
FIG. 6A is a plan view showing a state in which a laser beam is applied to the defective pixel of the liquid crystal panel shown in FIG. 5A and a bubble is generated.
Figure 6B:
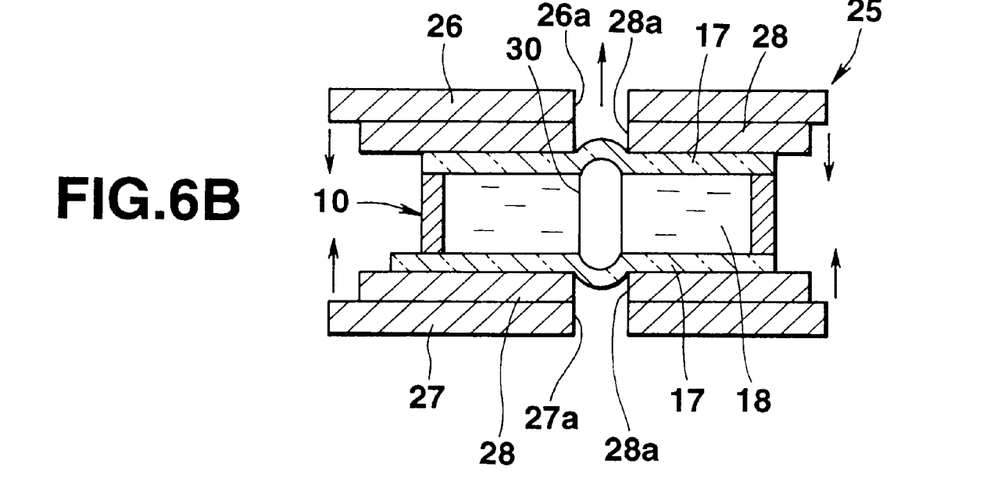
FIG. 6B is a cross-sectional view of the state shown in FIG. 6A.
Figure 8:
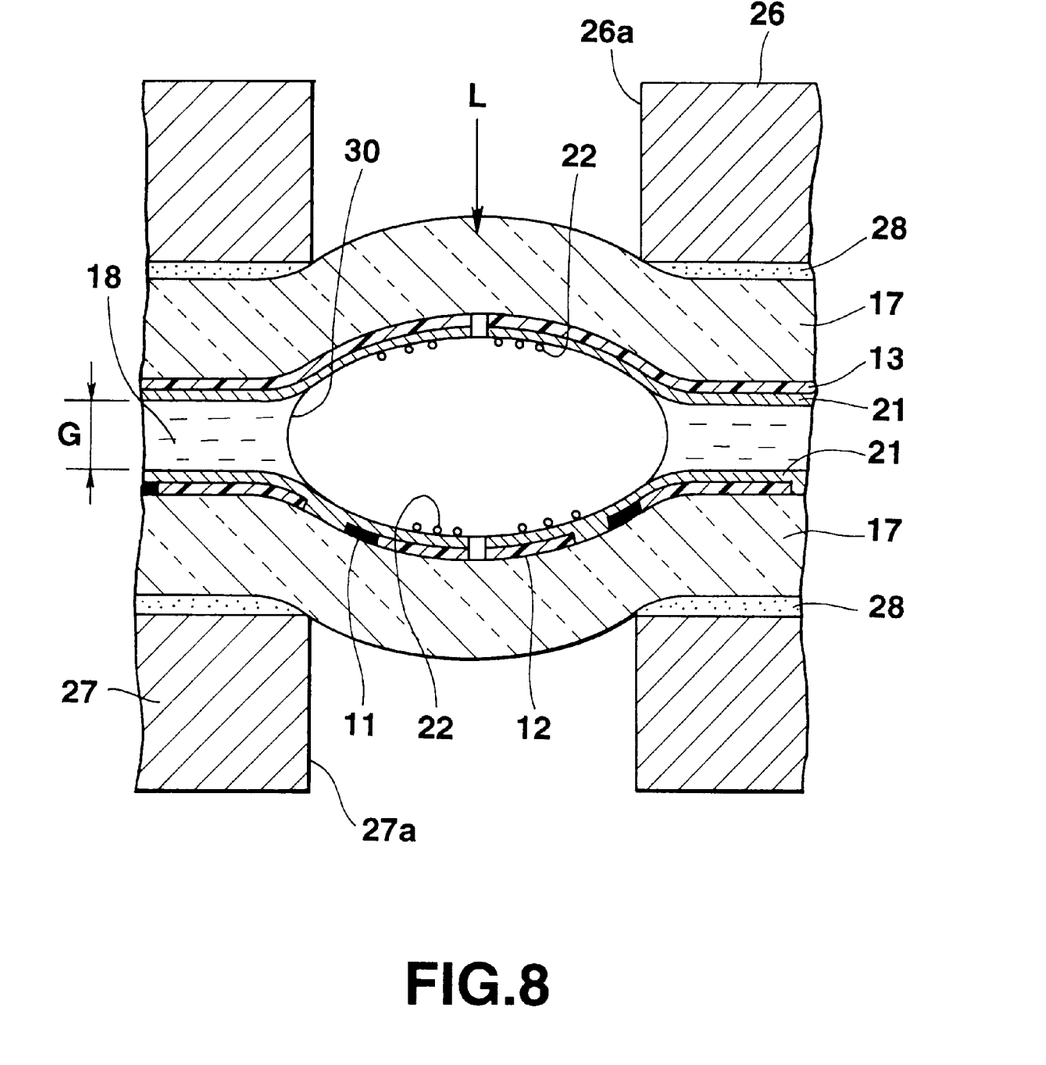
FIG. 8 is a partially enlarged cross-sectional view of the state shown in FIG. 6A, taken along a line different from that of FIG. 6B.

In this state, a laser beam is radiated from a portion above the liquid crystal panel 10 to the portion of the defective pixel 14 deformed like a dome, as indicated by the arrow L show in FIG. 8. Then, as shown in FIGS. 6A, 6B and 8, a bubble 30 is generated in the liquid crystal layer 18. At the same time, substances 22, such as materials of electrodes 12 and 13, an aligning film 21, or a foreign substance, are evaporated and broken, and then scattered in the bubble 30. At this time, the portion of the panel other than the defective pixel is pressurized by the pressurizing plates 26 and 27, resulting the pressure in the liquid crystal panel 10 being higher than the atmospheric pressure. In addition, the gap between the transparent substrates 17 of the portion corresponding to the defective pixel 14 is greater than that of the surrounding portion. Therefore, as shown in FIGS. 6A and 6B, the bubble 30 generated by the radiation of the laser beam expands in a region corresponding to the circular holes 26a and 27a, shaped like a circle centered at the point where the gap in the liquid crystal layer 18 is the greatest, on a plane parallel to the transparent substrate 17. As a result, the size and the shape of the bubble 30 are limited. In this embodiment, since the pressure in the liquid crystal panel 10 is higher than the atmospheric pressure, the bubble 30 expands in a smaller region as compared to the first embodiment. As in the first embodiment, an excimer laser or YAG laser can be used as a source of the laser beam, and the level of radiation energy can be about 0.1 to 2 J/cm$^2$. In this embodiment also, the number of pulses of radiation of the laser beam may be one to several tens. Since the bubble 30 generated in this state has a substantially circular cross section on a plane parallel to the transparent substrate 17, the expanding range of the bubble can be limited to a region inscribed or circumscribed to the defective pixel, or a neighboring region. Accordingly, the range of the scattered substance is also limited to a region having a circular cross section corresponding to the bubble. Therefore, since the substance is deposited in the defective pixel uniformly, a uniform image can be obtained and an adjacent pixel cannot be affected.

Figure 7A:
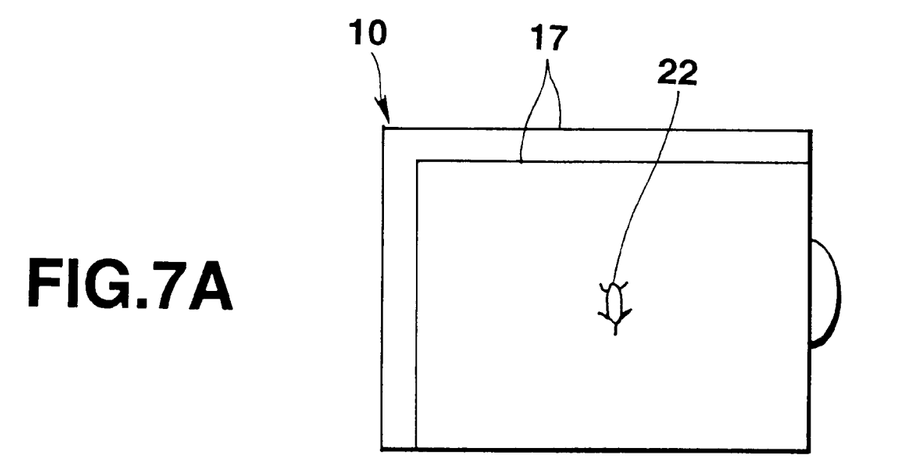
FIG. 7A is a plan view showing a state in which the pressure to the liquid crystal panel shown in FIG. 5A is released and the bubble is eliminated.
Figure 7B:
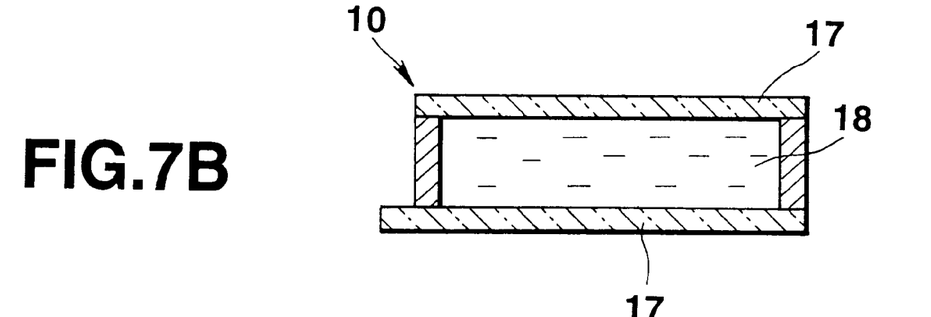
FIG. 7B is a cross-sectional view of the state shown in FIG. 7A.

After the laser beam is radiated, the bubble 30 is eliminated with the lapse of time, as shown in FIGS. 7A and 7B. Since the size of the bubble 30 and the range of the scattered substance 22 are limited in a range having a substantially circular cross section, unlike a radial range as in the conventional art, the display quality after correction of a defective pixel is improved. In this embodiment, the size of the bubble 30 and the scattered substance 22 can also be controlled freely, depending on the degree of deformation of the transparent substrate 17 or the radiation energy of the laser beam.

As has been described above, according to the present invention, the bubble generated by laser beam radiation expands substantially circularly parallel to the transparent substrates in a region where the gap between the transparent substrates is greater than the other region. The substances, such as the pixel electrode, wire member, aligning film, and/or foreign substance, broken by the laser radiation, are deposited in the region. Since the bubble has a substantially circular cross section, the range of the deposition of the substance can be limited to a region inscribed or circumscribed to the defective pixel, or a neighboring region. Accordingly, the range of the scattered substance is also limited to a region having a circular cross section corresponding to the bubble. Therefore, since the substance is deposited in the defective pixel uniformly, a uniform image can be obtained and an adjacent pixel cannot be affected, thereby improving the quality of display.

In the above embodiment, an active matrix liquid crystal panel is used; however, the present invention can be applied also to a passive TN or STN liquid crystal panel.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

We claim:

1. A method for correcting a defect in a liquid crystal panel, the liquid crystal panel having a pair of transparent substrates and a liquid crystal layer interposed therebetween, said method comprising:

a first step of causing a gap between the pair of transparent substrates in a portion of the liquid crystal panel corresponding to a defective pixel to be greater than that in a surrounding portion surrounding the portion corresponding to the defective pixel;

a second step of radiating a laser beam to the portion of the liquid crystal panel corresponding to the defective pixel; and a third step of returning the gap between the pair of transparent substrates in the portion of the liquid crystal panel corresponding to the defective pixel so as to be substantially the same as that in the surrounding portion.

2. The method for correcting a defect in a liquid crystal panel according to claim 1 wherein said step of radiating a laser beam includes generating a bubble in the liquid crystal layer in the portion radiated with the laser beam.

3. The method for correcting a defect in a liquid crystal panel according to claim 2, wherein the first step includes a step of decompressing the portion of the liquid crystal panel corresponding to the defective pixel to a pressure lower than that in the surrounding portion.

4. The method for correcting a defect in a liquid crystal panel according to claim 2, wherein the first step includes a step of vacuum absorbing a portion of the pair of transparent substrates corresponding to the defective pixel.

5. The method for correcting a defect in a liquid crystal panel according to claim 2, wherein the first step includes a step of pressurizing at least one of the pair of transparent substrates of the liquid crystal panel in the surrounding portion.

6. The method for correcting a defect in a liquid crystal panel according to claim 2, wherein the first step includes a step of pressurizing the liquid crystal panel by means of a pressurizing plate having an opening formed in a portion corresponding to the defective pixel.

7. The method for correcting a defect in a liquid crystal panel according to claim 2, wherein the first step includes a step of pressurizing both sides of the liquid crystal panel by means of a pair of pressurizing plates, each having an opening formed in a portion corresponding to the defective pixel.

8. A method for correcting a defect in a liquid crystal panel according to claim 1, further comprising:

preparing the liquid crystal panel having the pair of transparent substrates and the liquid crystal layer interposed therebetween; and detecting a defective pixel of the liquid crystal panel prior to the steps of causing a gap, radiating a laser beam and returning the gap.

9. The method for correcting a defect in a liquid crystal panel according to claim 8, wherein the first step includes a step of decompressing the portion of the liquid crystal panel corresponding to the defective pixel to a pressure lower than that in the surrounding portion.

10. The method for correcting a defect in a liquid crystal panel according to claim 8, wherein the first step includes a step of vacuum absorbing a portion of the pair of transparent substrates corresponding to the defective pixel of the liquid crystal panel.

11. The method for correcting a defect in a liquid crystal panel according to claim 8 wherein the first step includes a step of pressurizing at least one of the pair of transparent substrates of the liquid crystal panel in the surrounding portion.

12. The method for correcting a defect in a liquid crystal panel according to claim 8, wherein the first step includes a step of pressurizing the liquid crystal panel by means of a pressurizing plate having an opening formed in a portion corresponding to the defective pixel.

* * * * *